United States Patent
Leang

(10) Patent No.: US 9,676,322 B2
(45) Date of Patent: Jun. 13, 2017

(54) LIGHT LINKING SYSTEM

(71) Applicant: KC HILITES, INC., Williams, AZ (US)

(72) Inventor: Bobby Leang, Williams, AZ (US)

(73) Assignee: KC HILITES INC., Williams, AZ (US)

( * ) Notice: Subject to any disclaimer, the term of this patent is extended or adjusted under 35 U.S.C. 154(b) by 280 days.

(21) Appl. No.: 14/704,736

(22) Filed: May 5, 2015

(65) Prior Publication Data

US 2016/0327247 A1 Nov. 10, 2016

(51) Int. Cl.
*F21V 21/005* (2006.01)
*B60Q 1/26* (2006.01)
*F21S 8/00* (2006.01)
*B60Q 1/00* (2006.01)

(52) U.S. Cl.
CPC .......... *B60Q 1/2611* (2013.01); *B60Q 1/2615* (2013.01); *F21S 8/003* (2013.01); *F21V 21/005* (2013.01); *B60Q 1/0041* (2013.01)

(58) Field of Classification Search
CPC ..... F21V 21/00; F21V 21/005; B60Q 1/2611; B60Q 1/2615; F21S 8/003
USPC ... 362/227, 249.01, 249.09, 249.1, 493, 543
See application file for complete search history.

(56) References Cited

U.S. PATENT DOCUMENTS

| 5,931,573 A | * | 8/1999 | Knox | B60Q 1/2611 340/471 |
| 2004/0032745 A1 | * | 2/2004 | Pederson | B60Q 1/2611 362/545 |
| 2010/0328943 A1 | * | 12/2010 | Takamura | F21S 2/00 362/235 |

(Continued)

FOREIGN PATENT DOCUMENTS

TW           M491784 U    12/2014

*Primary Examiner* — Andrew Coughlin
*Assistant Examiner* — Meghan Ulanday
(74) *Attorney, Agent, or Firm* — J.C. Patents

(57) ABSTRACT

This invention relates to a light linking system, which includes a plurality of casings and lamps, and two binding members as main components combined together. Said casing is a hollow shell structure provided with a first housing and a second housing, said first housing has a first inner recessed annular wall which is in line with the shape of the lamp, the first housing is provided with a first hinge mount and a second hinge mount set correspondingly on both sides of the first housing, to connect the first hinge mount and second hinge mount of adjacent casings correspondingly. Said first hinge mount and second hinge mount set with the limiting members(s) to get a pre-determined angle range and limit the bending angle range of adjacent casings. Said second housing has a second inner recessed annular wall which is in line with the shape of the lamp for clamping the lamp together by the first inner recessed annular wall of first housing and the second inner recessed annular wall of second housing. Said binding members are set on both sides of the light bar formed by a plurality of (Continued)

casing. Therefore, this invention can be installed in all kinds of vehicles or lighting tools, and the angle of adjacent lamps can be adjusted by the hinge casings, so that, according to the requirement, the beam of the light bar can be adjusted focus or diffusion to obtain the most extensive and most clear irradiation range.

17 Claims, 6 Drawing Sheets

(56) References Cited

U.S. PATENT DOCUMENTS

2014/0362555 A1* 12/2014 Turk ............... G03B 15/03
362/3

* cited by examiner

LIGHT LINKING SYSTEM

FIELD OF THE INVENTION

The light linking system of present invention is applied to vehicles or lighting tools, particularly referring to a system by means of a hinge casing to connect a plurality of lamps into a light bar, the hinge casing can adjust the angle of the adjacent lamps to make this system has the best irradiation range, and it's lighting can be appeared seamless.

DESCRIPTION OF RELATED ART

According to conventional technology of light linking structure such as Taiwan utility model patent of No. M491784, as shown in FIG. 1, it discloses a light linking structure with a plurality of searchlight 301a provided on the base mount 20a, the disadvantage of this light linking structure is each searchlight 301a must be individually locked on the base mount 20a, so the height of searchlight 301a will be increased. Moreover, as shown in FIG. 2, said prior art also discloses another light linking structure, a tilt angle of the light bar of light linking structure is adjustable, but all the searchlights are fixed inside the inflexible straight bar 20, so the adjacent searchlights cannot be adjusted to the best irradiation range.

For this reason, the inventor with cumulative years of experience in the design and manufacture of related products studied the problems of aforementioned light linking structure for this invention.

SUMMARY OF THE INVENTION

The purpose of present invention is to provide a light linking system, this system does not need to set a base mount and can connect a plurality of lamps to form a light bar. Moreover, according to the beam width of the lamps, this system can adjust the angle of adjacent lamps by hinge casings. So that, according to the requirement, the beam of the light bar can be adjusted focus or diffusion to obtain the most extensive and most clear irradiation range.

In order to reach the aforementioned purpose, the present invention of the light linking system at least includes a plurality of casings and lamps, and two binding members as main components combined together. Said casing is a hollow shell structure provided with a first housing and a second housing, said first housing has a first inner recessed annular wall which is in line with the shape of a lamp, the first housing is provided with a first hinge mount and a second hinge mount set correspondingly on both sides of the first housing, to connect the first hinge mount and second hinge mount of adjacent casings correspondingly. Said first hinge mount and second hinge mount set with the limiting members(s) to get a pre-determined angle range and limit the bending angle range of adjacent casings. Said second housing has a second inner recessed annular wall which is in line with the shape of the lamp for clamping the lamp together by the first inner recessed annular wall of first housing and the second inner recessed annular wall of second housing. Said binding members are set on both sides of the light bar formed by a plurality of casing.

The light linking system of present invention, among which the pre-determined angle range of limiting member of the first hinge mount and second hinge mount is 0~5°.

The light linking system of present invention, among which the binding site of first hinge mount and second hinge mount of adjacent casings sets with the tooth slot(s), and using a bolt to lock and fixedly position the first hinge mount and second hinge mount.

The light linking system of present invention, among which the binding site of first hinge mount and second hinge mount of adjacent casings sets with the radial tooth slot(s), so that an angle between adjacent casings can be adjusted by the radial tooth slot and using a bolt to lock and fixedly position the first hinge mount and second hinge mount.

The light linking system of present invention, among which the binding site of first hinge mount and second hinge mount of adjacent casings sets with the locating ring(s) to auxiliary fix the first hinge mount and second hinge mount.

DETAILED DESCRIPTION OF THE PREFERRED EMBODIMENTS

A first preferred embodiment of a light linking system in the present invention, as shown in FIGS. 1~11, includes a plurality of casings 1 and lamps 2, and two binding members 3 as main components combined together.

Figure 2:
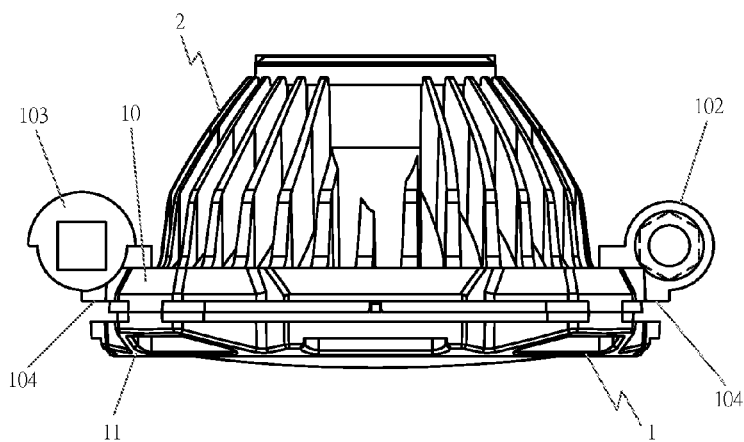
FIG. 2 is a top view of the casing and lamp in the present invention.
Figure 5:
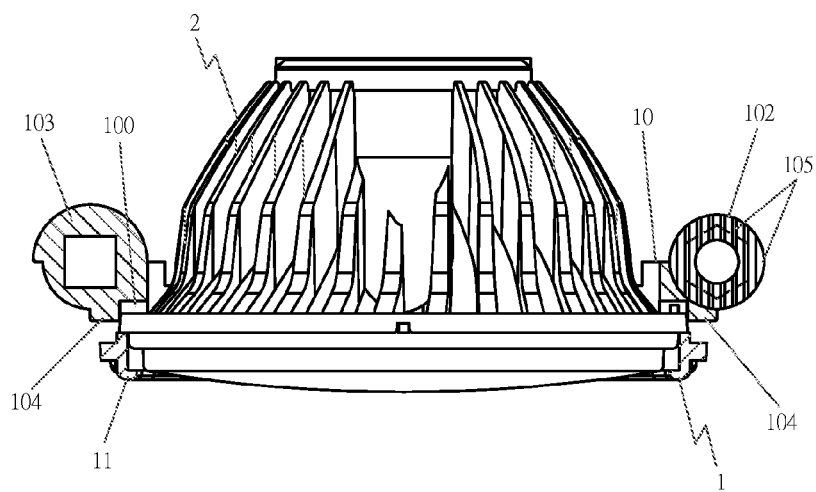
FIG. 5 is an enlarged sectional view of B-B shown in FIG. 3.
Figure 6:
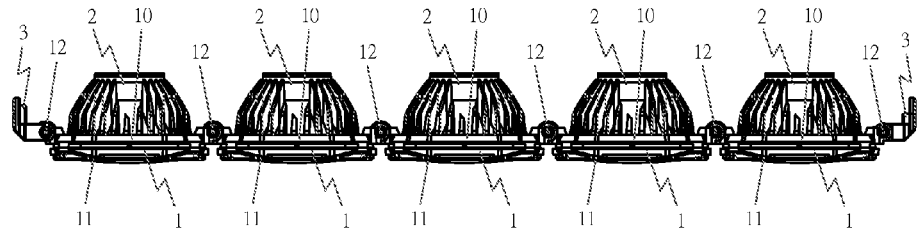
FIG. 6 is a top view of the light linking system in the present invention.
Figure 7:
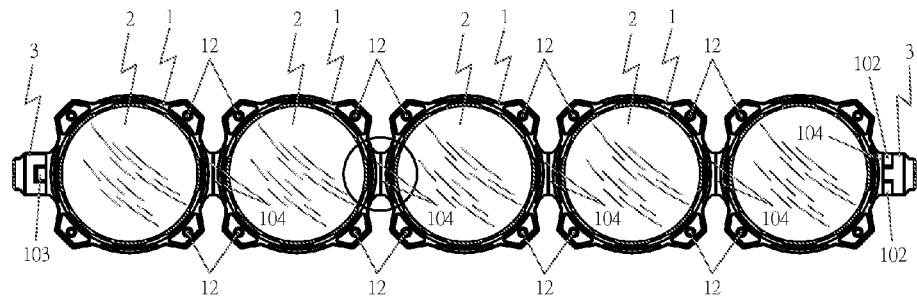
FIG. 7 is a front view of the light linking system in the present invention.
Figure 11:
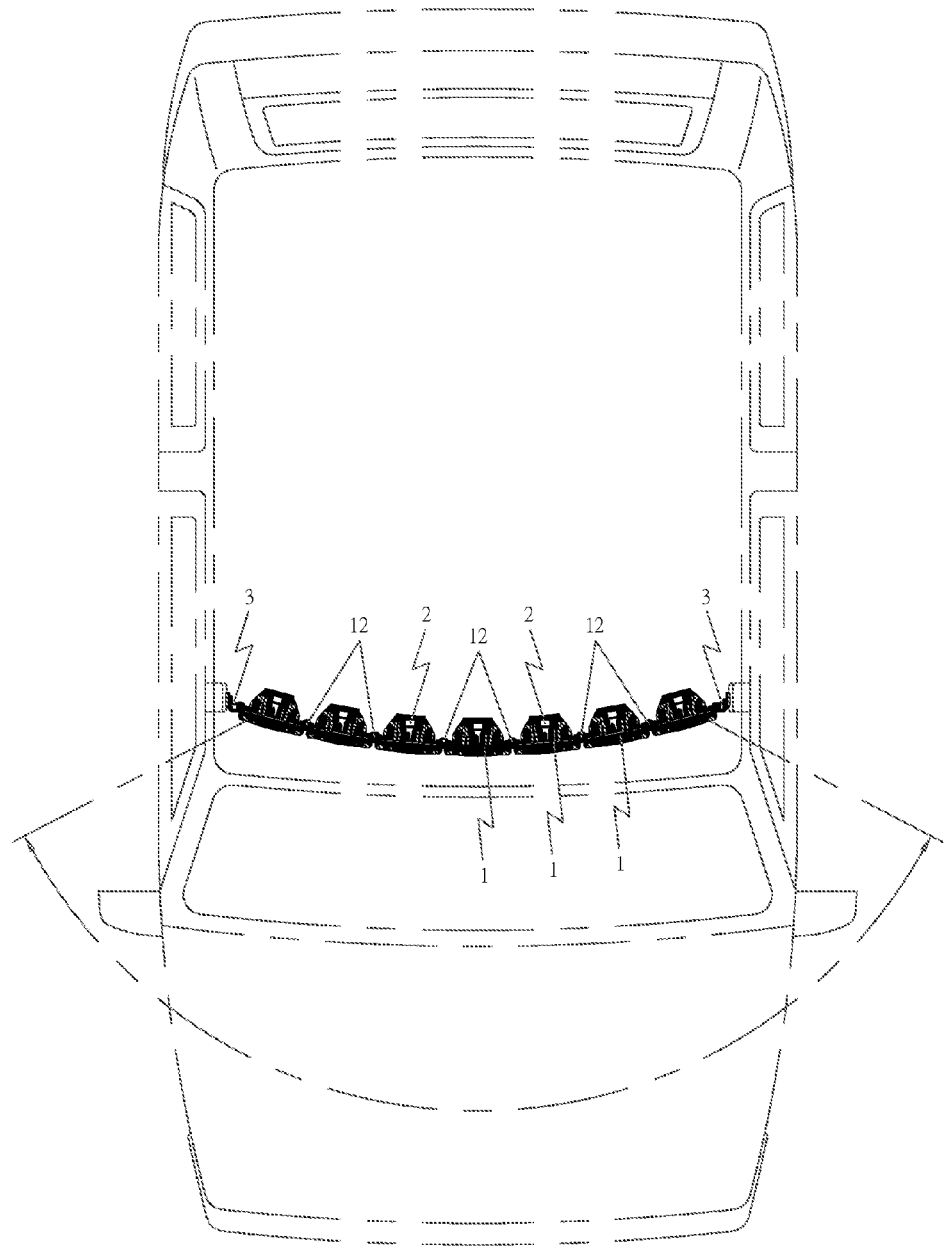
FIG. 11 is an use case view of the light linking system in the present invention.

The casing 1 is a hollow shell structure provided with a first housing 10 and a second housing 11 for collaborative clamping the lamp 2. Said first housing 10 has a first inner recessed annular wall 100 which is in line with the shape of a lamp 2 for fixing the lamp 2 therein, the first housing 10 has a plurality of bolt holes 101 and there is a first hinge mount 102 and a second hinge mount 103 set correspondingly on both sides of the first housing, to connect the first hinge mount 102 and second hinge mount 103 of adjacent casings 1 correspondingly. Said first hinge mount 102 and second hinge mount 103 can set with the limiting members (s) 104 to get a pre-determined angle range and limit the bending angle range of adjacent casings 1, besides, this invention also cannot set the limiting member 104 to get a full-angle range and not limit the bending angle range of adjacent casings 1. As shown in FIGS. 2, 5 and 11, a pre-determined angle range of limiting member 104 can limit the bending angle range of adjacent casings 1 to form a "radius" bar shape. For example, a lamp have a left/right beam width of 8~10°, if the pre-determined angle range of limiting member 104 of the first hinge mount 102 and second hinge mount 103 is 0~5°, then the beam of the light bar will be full-articulation and there is still enough bleed-over with the beam angle that it appears seamless, to obtain the best irradiation range.

Figure 1:
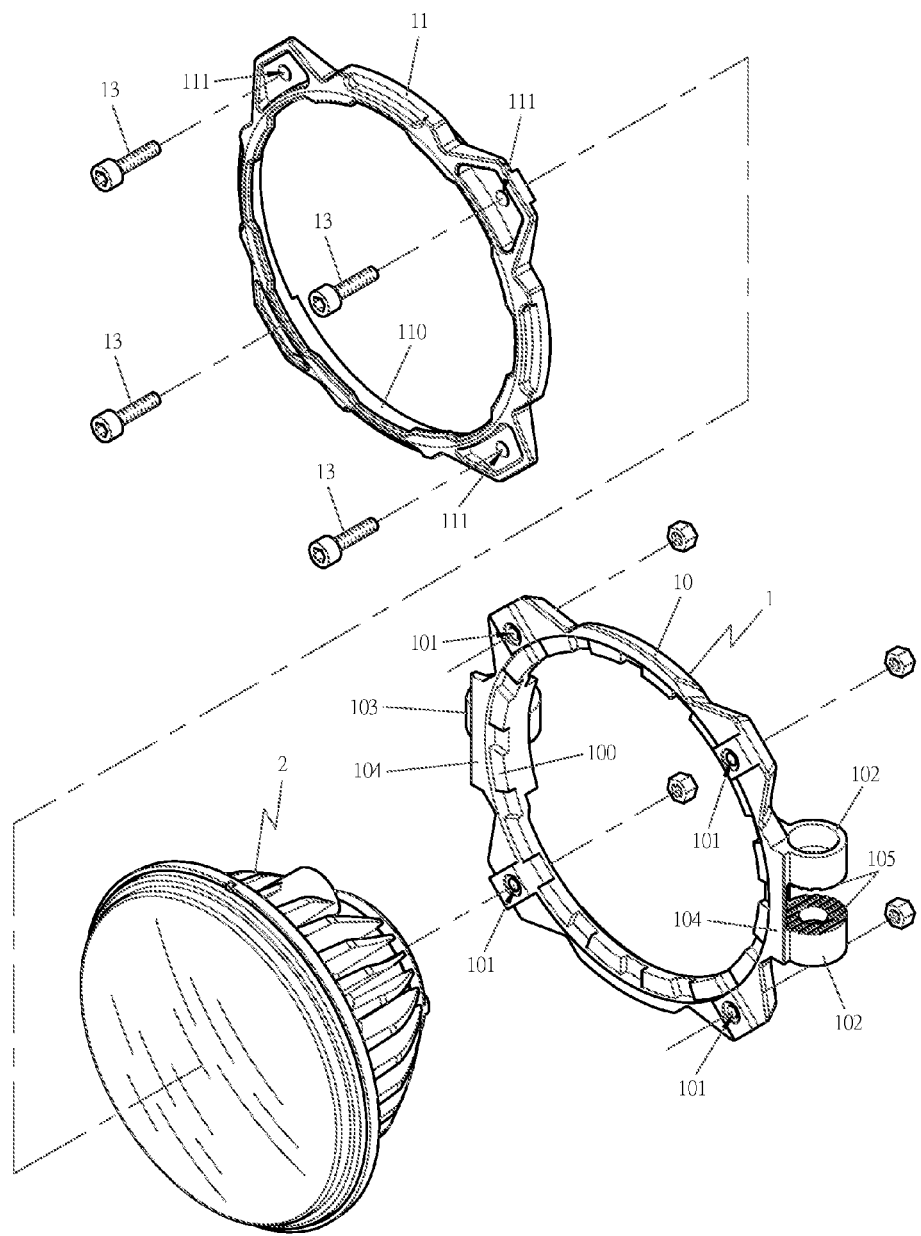
FIG. 1 is an exploded perspective view of the casing and lamp in the present invention.
Figure 3:
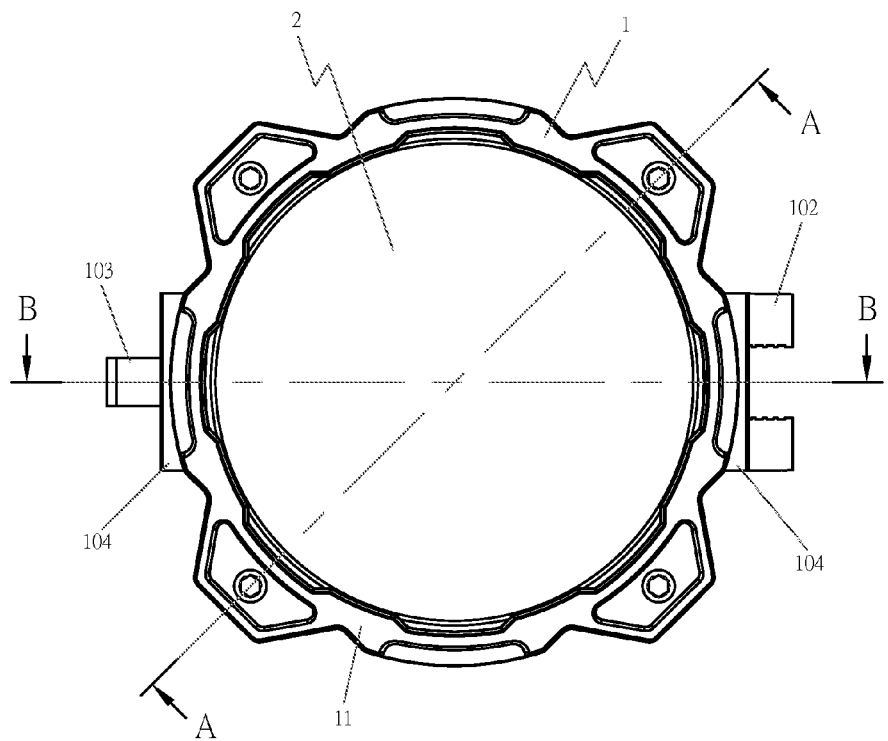
FIG. 3 is a front view of the casing and lamp in the present invention.
Figure 4:
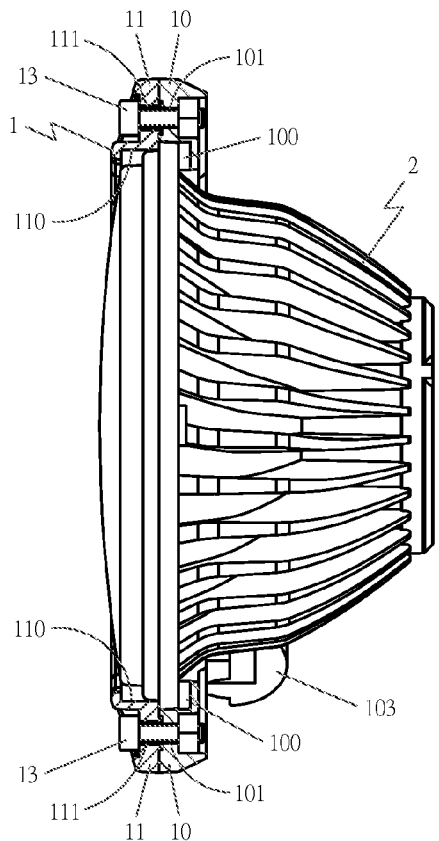
FIG. 4 is an enlarged sectional view of A-A shown in FIG. 3.
Figure 8:
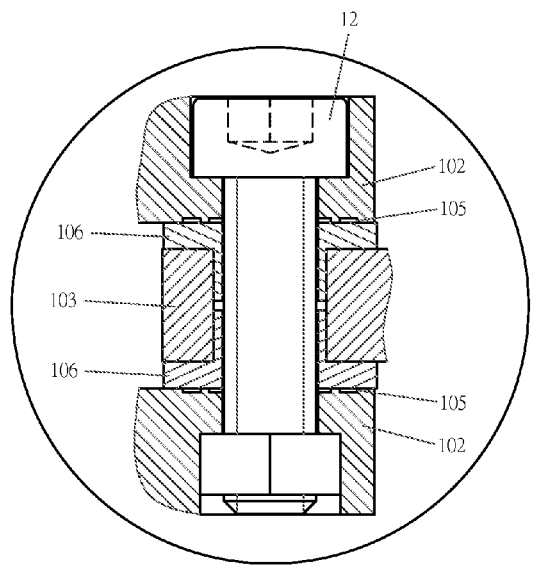
FIG. 8 is an enlarged sectional view of a part shown in FIG. 7.
Figure 9:
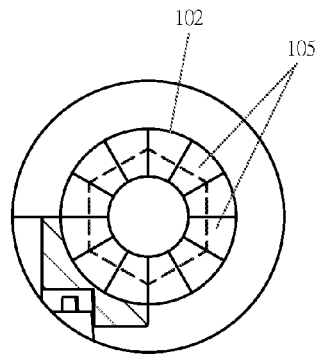
FIG. 9 is an enlarged sectional view of the hinge mount provided with radial tooth slot.
Figure 10:
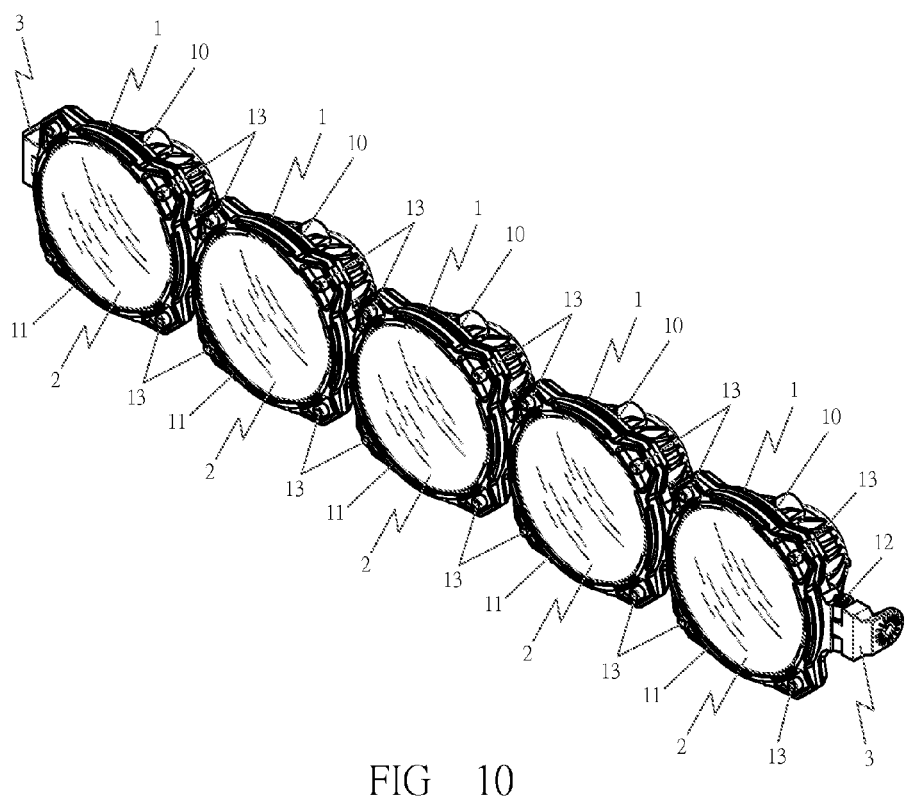
FIG. 10 is a three-dimensional view of the light linking system in the present invention.

As shown in FIGS. 1, 3 and 8, the binding site of first hinge mount 102 and second hinge mount 103 of adjacent casings 1 can set with the tooth slot(s) 105 for using a bolt 12 to lock and fixedly position the first hinge mount 102 and second hinge mount 103 after an angle between adjacent casings 1 is adjusted by a user. As shown in FIG. 8, the binding site of first hinge mount 102 and second hinge mount 103 of adjacent casings 1 can set with the locating ring(s) 106 to auxiliary fix the first hinge mount 102 and second hinge mount 103. As shown in FIG. 9, said tooth slot 105 can be a radial tooth slot 105 set in the binding site of first hinge mount 102 and second hinge mount 103 of adjacent casings 1 so that an angle between adjacent casings 1 can be adjusted by the radial tooth slot 105 and using a bolt 12 to lock and fixedly position the first hinge mount 102 and second hinge mount 103.

Said second housing 11 has a second inner recessed annular wall 110 which is in line with the shape of the lamp 2 for clamping the lamp 2 together by the first inner recessed annular wall 100 of first housing 10 and the second inner recessed annular wall 110 of second housing 11. The second housing 11 has a plurality of bolt holes 101 corresponding to the bolt holes 101 of first housing 10, so that the first housing 10 and second housing 11 can be fixed by screws. Besides, the first housing 10 and second housing 11 also can set with corresponding internal thread and external thread to screw the first housing 10 and second housing 11.

The lamp 2 is provided inside said casing 1, and the lamp 2 can be a searchlight or all kinds of lamps.

The binding members 3 are set on both sides of a light bar formed by a plurality of casing 1, and the light bar can be fixed by the binding members 3. Said binding members 3 also can connect with a rotary seat to rotate the light bar or adjust a tilt angle of the light bar (not shown in the drawings).

As shown in FIG. 11, when the light linking system of the present invention is applied in a car, the amount of the casings 1 can be decided according to the width of the car and all the casings 1 will be connected to form a light bar, then the light linking system will be fixed on the car by locking the binding members 3 and car frame after adjusting the requirement bending angle of the light bar. So that the car will obtain the most extensive and most clear irradiation range to ensure the traffic safety. Evidently this invention has tangible benefits and tallies with progressiveness and novelty demanded by patent laws.

While the preferred embodiments of this invention have been described above, it will be recognized and understood that various modifications may be made therein and appended claims are intended to cover all such modifications that may fall within the spirit and scope of the invention.

What is claimed is:

1. A light linking system at least comprising:
a plurality of casings provided with a first housing and a second housing, wherein said first housing has a first inner recessed annular wall which is in line with the shape of a lamp, the first housing is provided with a first hinge mount and a second hinge mount set correspondingly on both sides of the first housing, to connect the first hinge mount and second hinge mount of adjacent casings correspondingly, said first hinge mount and second hinge mount set with a limiting members to get a pre-determined angle range and limit bending angle range of adjacent casings, said second housing has a second inner recessed annular wall which is in line with the shape of the lamp for clamping the lamp together by the first inner recessed annular wall of first housing and the second inner recessed annular wall of second housing; and
a plurality of lamps provided inside said casings respectively; and
two binding members are set on the both sides of a light bar formed by a plurality of casings.

2. The light linking system according to claim 1, wherein said casing is a hollow shell structure.

3. The light linking system according to claim 1, wherein the pre-determined angle range of the limiting member of the first hinge mount and second hinge mount is 0~5°.

4. The light linking system according to claim 1, wherein the first hinge mount and second hinge mount of adjacent casings are fixed by a bolt.

5. The light linking system according to claim 1, wherein the binding site of first hinge mount and second hinge mount of adjacent casings sets with a tooth slot, and using a bolt to lock and fixedly position the first hinge mount and second hinge mount.

6. The light linking system according to claim 1, wherein the binding site of first hinge mount and second hinge mount of adjacent casings sets with a radial tooth slot, so that an angle between adjacent casings can be adjusted by the radial tooth slot and using a bolt to lock and fixedly position of the first hinge mount and second hinge mount.

7. The light linking system according to claim 1, wherein the binding site of first hinge mount and second hinge mount of adjacent casings sets with a locating ring to auxiliary fix the first hinge mount and second hinge mount.

8. The light linking system according to claim 1, wherein the first housing and second housing have a plurality of corresponding bolt holes, and the first housing and second housing are fixed by screws.

9. The light linking system according to claim 1, wherein the first housing and second housing set with corresponding internal thread and external thread.

10. The light linking system according to claim 1, wherein the lamp is a searchlight.

11. The light linking system according to claim 1, wherein the binding members are connected with a rotary seat to rotate the light bar or adjust a tilt angle of the light bar.

12. A light linking system at least comprising:
a plurality of casings provided with a first housing and a second housing, wherein said first housing has a first inner recessed annular wall which is in line with the shape of a lamp, the first housing is provided with a first hinge mount and a second hinge mount set correspondingly on both sides of the first housing, to connect the first hinge mount and second hinge mount of adjacent casings correspondingly, a binding site of first hinge mount and second hinge mount of adjacent casings sets with a radial tooth slot, so that an angle between adjacent casings can be adjusted by the radial tooth slot and using a bolt to lock and fixedly position the first hinge mount and second hinge mount, said second housing has a second inner recessed annular wall which is in line with the shape of the lamp for clamping the lamp together by the first inner recessed annular wall of the first housing and the second inner recessed annular wall of the second housing; and
a plurality of lamps provided inside said casing respectively; and two binding members are set on both sides of a light bar formed by a plurality of casings.

13. The light linking system according to claim 12, wherein said casing is a hollow shell structure.

14. The light linking system according to claim 12, wherein the first housing and second housing have a plurality of corresponding bolt holes, and the first housing and second housing are fixed by screws.

15. The light linking system according to claim 12, wherein the first housing and second housing set with corresponding internal thread and external thread.

16. The light linking system according to claim 12, wherein the lamp is a searchlight.

17. The light linking system according to claim 12, wherein the binding members are connected with a rotary seat to rotate the light bar or adjust a tilt angle of the light bar.

\* \* \* \* \*